(12) United States Patent
Harada et al.

(10) Patent No.: US 6,902,709 B1
(45) Date of Patent: Jun. 7, 2005

(54) HYDROGEN REMOVING APPARATUS

(75) Inventors: Makoto Harada, Yokohama (JP); Mika Tahara, Yokohama (JP); Kenji Arai, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 954 days.

(21) Appl. No.: 09/589,168

(22) Filed: Jun. 8, 2000

(30) Foreign Application Priority Data

Jun. 9, 1999 (JP) .......................................... 11-161984

(51) Int. Cl.$^7$ .......................... B01D 50/00; B01D 53/34
(52) U.S. Cl. ...................................... 422/177; 422/169
(58) Field of Search ................................ 422/177, 169, 422/170, 171; 423/237, 248, 352

(56) References Cited

U.S. PATENT DOCUMENTS

| | | | |
|---|---|---|---|
| 4,012,490 A | * 3/1977 | Lofredo | ........................ 423/262 |
| 4,142,993 A | 3/1979 | Elofson et al. | ............. 252/447 |
| 4,163,775 A | * 8/1979 | Foster et al. | ................. 423/363 |
| 4,228,132 A | * 10/1980 | Weems et al. | ............... 422/174 |
| 5,301,217 A | * 4/1994 | Heck et al. | ................... 376/301 |
| 5,495,511 A | * 2/1996 | Chakraborty | ................ 376/301 |

FOREIGN PATENT DOCUMENTS

| | | |
|---|---|---|
| GB | 822867 | 11/1959 |
| JP | 5-507553 | 10/1993 |
| JP | 08-297194 | 11/1996 |
| WO | WO 98/35356 | 5/1998 |

* cited by examiner

Primary Examiner—M. Alexandra Elve
(74) Attorney, Agent, or Firm—Finnegan, Henderson, Farabow, Garrett & Dunner, L.L.P.

(57) ABSTRACT

A hydrogen removing apparatus removes without fail the hydrogen gas generated within a nuclear reactor-housing vessel by a metal-water reaction so as to suppress the pressure elevation within the nuclear reactor-housing vessel. The hydrogen removing apparatus comprises a reactor provided with at least two openings through which the outer atmosphere is introduced into the reactor and a catalyst bed arranged within the reactor and loaded with a catalyst for promoting the ammonia synthesizing reaction between a nitrogen gas and a hydrogen gas.

11 Claims, 5 Drawing Sheets

HYDROGEN REMOVING APPARATUS

CROSS-REFERENCE TO RELATED APPLICATIONS

This application is based upon and claims the benefit of priority from the prior Japanese Patent Application No. 11-161984, filed Jun. 9, 1999, the entire contents of which are incorporated herein by reference.

BACKGROUND OF THE INVENTION

The present invention relates to a hydrogen removing apparatus for removing a hydrogen gas generated within a free space.

An apparatus in which a hydrogen gas is generated includes, for example, a vessel housing a nuclear reactor. FIG. 11 is a cross sectional view schematically showing a conventional vessel housing a nuclear reactor. As shown in the drawing, a nuclear reactor pressure vessel 101 housing a nuclear reactor core 107 is housed in a nuclear reactor-housing vessel 102, which is also called a primary containment vessel. The nuclear reactor-housing vessel 102 comprises an upper dry well 103, a lower dry well 104, and a wet well 105 communicating with the upper dry well 103 via a vent pipe 106 and having a suppression pool 105a arranged in a lower portion. A nuclear reactor primary cooling pipe such as a main vapor pipe 108 is connected to the nuclear reactor pressure vessel 101.

If the nuclear reactor primary cooling pipe such as the main vapor pipe 108 should be ruptured, a nuclear reactor primary cooling material having a high temperature and a high pressure is released into the upper dry well 103 within the nuclear reactor-housing vessel 102. As a result, the pressure and temperature within the upper dry well 103 are rapidly elevated. The cooling material is mixed with the gas within the upper dry well 103 and released through the vent pipe 106 into the water within the suppression pool 105a so as to be cooled by the heat energy absorption performed by the water.

In the cooling step, the water within the suppression pool 105a is poured into the nuclear reactor pressure vessel 101 by the function of an emergency reactor core cooling system so as to cool the reactor core 107. The cooling water absorbs decay heat from the reactor core 107 over a long period of time and flows into the dry wells 103, 104 through a broken port of the broken pipe. In this case, the pressure and temperature within the upper dry well 103 are kept higher than those within the wet well 105. Within the nuclear reactor of a light-water type nuclear power plant, which is put under such a long term situation, the water acting as a coolant is decomposed by radiation so as to generate a hydrogen gas and an oxygen gas.

Also, if the temperature of the fuel-covering pipe is elevated, a so-called "metal-water reaction" takes place between steam and zirconium forming the fuel-covering pipe, with the result that a hydrogen gas is generated in a short time. The hydrogen gas thus generated is released from the broken port of the broken pipe into the nuclear reactor-housing vessel. Since the hydrogen gas cannot be condensed, the pressure within the nuclear reactor-housing vessel 102 is increased with increase in the hydrogen gas concentration within the nuclear reactor-housing vessel 102.

When the hydrogen gas concentration and the oxygen gas concentration are increased to exceed a combustible limit, the gas is put in a combustible state. If the hydrogen gas is further increased, an excess reaction tends to take place.

Under the circumstances, in the conventional boiling water type nuclear power generation facilities, a nitrogen gas is substituted within the nuclear reactor-housing vessel of a pressure suppression type so as to maintain the oxygen concentration at a low level and, thus, to prevent a combustible atmosphere from being formed within the nuclear reactor-housing vessel by the hydrogen gas generated by the metal-water reaction. It is also conceivable to permit the hydrogen gas and the oxygen gas within the nuclear reactor-housing vessel to be combined again to form water by a dynamic means such as a blower connected to an external power source so as to suppress increase of the combustible gas concentration.

Japanese Patent Disclosure (Kohyo) No. 5-507553 discloses a method of statically controlling the combustible gas concentration by promoting the re-combination reaction between hydrogen and oxygen by using an oxidizing catalyst of hydrogen and without requiring an external power source.

Each of the methods described above is effective in the case where the oxygen gas has a reasonably high concentration. However, it is difficult to remove the hydrogen gas under the conditions that a large amount of a hydrogen gas is generated by the metal-water reaction and the oxygen gas concentration is low. In the present system, it is planned to release the atmosphere within the nuclear reactor-housing vessel to the outer environment so as to lower the pressure within the nuclear reactor-housing vessel and, thus, to solve the problem. In this case, however, it is possible for radioactive waste material to be discharged to the outer environment.

Under the circumstances, it is proposed to use a hydrogen absorbing alloy for removing the hydrogen gas even under the condition of a low oxygen concentration. However, the weight of the hydrogen absorbed by the hydrogen absorbing alloy is only about several percent of the alloy weight. For example, the weight of the hydrogen absorbed by a TiFe alloy widely used nowadays as a hydrogen absorbing alloy is about 1.8% of the alloy weight. Naturally, a tremendously large amount of a hydrogen absorbing alloy is required for coping with the case where a large amount of a hydrogen gas is generated as in the metal-water reaction. It follows that it is impractical to use a hydrogen absorbing alloy for removing the hydrogen gas generated in a nuclear reactor-housing vessel.

BRIEF SUMMARY OF THE INVENTION

An object of the present invention is to provide a hydrogen removing apparatus capable of removing without fail the hydrogen gas generated in a hermetically closed space filled with a nitrogen gas and containing a low concentration of an oxygen gas and capable of ensuring a satisfactory environment of the closed space by suppressing the elevation of the pressure within the closed space caused by hydrogen gas generation.

Particularly, where the hydrogen removing apparatus of the present invention is installed within a nuclear reactor-housing vessel, it is possible to suppress the pressure elevation caused by a hydrogen gas generation within the nuclear reactor-housing vessel without releasing the atmosphere within the nuclear reactor-housing vessel to the outer environment.

According to the present invention, there is provided a hydrogen removing apparatus, comprising:

a reactor having at least two openings for introducing an outer atmosphere into the reactor; and a catalyst bed arranged within the reactor and loaded with a catalyst for forming ammonia from nitrogen and hydrogen.

If the hydrogen removing apparatus of the particular construction is arranged within, for example, a nuclear reactor-housing vessel, which is also called primary containment vessel, the hydrogen and nitrogen within the atmosphere are coupled by a catalytic reaction to form ammonia in the case where the hydrogen gas concentration within the nuclear reactor-housing vessel is increased. Since the ammonia synthesizing reaction is an exothermic reaction, the catalyst bed is heated by the heat of reaction, with the result that the gas within the catalyst bed is moved upward within the reactor so as to be discharged to the outside of the reactor, thereby forming a natural circulating gas stream. As a result, the hydrogen gas generated within the nuclear reactor-housing vessel and the nitrogen gas present within the nuclear reactor-housing vessel are introduced without using a dynamic equipment into the catalyst bed so as to synthesize ammonia under, for example, the condition that the primary pipe of the nuclear reactor is ruptured. Since the volume of the gas is decreased both before and after the reaction, it is possible to suppress the pressure elevation caused by the hydrogen gas generation within the nuclear reactor-housing vessel.

It is possible for the hydrogen removing apparatus of the present invention to assume various types as described below:

(1) It is desirable for the reactor to house an additional catalyst serving to promote water formation from oxygen and hydrogen.

Where the hydrogen removing apparatus of the particular construction is arranged within a predetermined space and the hydrogen concentration within the space is increased, the oxidizing reaction of hydrogen to form water and the ammonia synthesizing reaction between hydrogen and nitrogen take place substantially in parallel. As a result, the catalyst bed and the gas flowing through the catalyst bed are heated by the heat of reaction so as to form a natural circulating stream of gas. Also, since the ammonia synthesizing catalyst is heated and activated by the heat generated by the oxidizing reaction of hydrogen, the rate of the ammonia synthesizing reaction is increased, with the result that the hydrogen removing rate is increased. What should also be noted is that, since oxygen is consumed by the oxidizing reaction of hydrogen, the reaction atmosphere is prevented from reaching a combustible limit.

(2) The catalyst consists of at least one element selected from the group consisting of Ru, Pd, Pt, Ir, W, Ag, Au, Rh and Re. It is desirable for the catalyst bed to contain 0.1 to 50% by weight of the catalyst.

It is desirable for the catalyst bed to have the catalyst and a carrier supporting the catalyst. At least one material selected from the group consisting of $SiO_2$, $Al_2O_3$, $TiO_2$ and $ZrO_2$ should desirably be used as a carrier of the catalyst. The carrier should desirably have a specific surface area falling within a range of between 10 $m^2/g$ and 200 $m^2/g$.

It is desirable for the catalyst bed to further comprise at least one co-catalyst selected from the group consisting of $CeO_2$, $La_2O_3$, MgO, $K_2O$, $Na_2O$, CaO, CsOH and $CsNO_3$. Particularly, the co-catalyst content of the catalyst be should desirably be 1 to 30% by weight.

In general, the catalyst for synthesizing ammonia has a start-up temperature higher than that of the oxidizing catalyst of hydrogen. Therefore, it is desirable to select the particular catalyst described previously and the carrier or the co-catalyst. Where the particular catalyst bed is housed in the reactor, it is possible to increase the ammonia synthesizing reaction rate under the condition of the atmosphere within the nuclear reactor-housing vessel, the atmosphere being expected after occurrence of, for example, rupture of the nuclear reactor primary pipe within the installing space, e.g., within the nuclear reactor-housing vessel.

(3) It is desirable for the catalyst bed to consist of a plurality of plate-like cartridges each having granular catalysts loaded therein and arranged a predetermined distance apart from each other.

In the catalyst bed of the particular construction, a gas flow passageway is formed in the clearance between adjacent cartridges, and the gas in the clearance between adjacent cartridges is allowed to form a natural circulating stream by the heat of the catalytic reaction. As a result, it is possible to introduce the gas within the installing space into the catalyst bed within the reactor without using a dynamic equipment. Further, it is possible to prevent a catalyst poison material that is in the state of an aerosol from being precipitated on the catalyst bed by utilizing the difference in the diffusion rate toward the cartridge between the catalyst poison material in the state of an aerosol and the gas, which is derived from the difference in the specific gravity between the catalyst poison material and the gas. As a result, the catalytic activity is prevented from being lowered, making it possible to maintain a satisfactory catalytic effect.

Incidentally, it is desirable to arrange the plurality of cartridges within the reactor such that the gas passageway formed in the clearance between adjacent cartridges extends substantially perpendicular to the bottom surface of the reactor.

(4) It is desirable for the catalyst bed to consist of a cylindrical cartridge loaded with a granular catalyst and for the cartridge to have gas flow portions formed at least at the bottom and top portions such that the atmosphere both inside and outside the cartridge flows through the gas flow portions.

According to the catalyst bed of the particular construction, a natural gas circulating stream is formed between the atmosphere within the cartridge and the atmosphere outside the cartridge by the heat of the catalytic reaction, making it possible to introduce the gas of the atmosphere into the catalyst bed within the reactor of the hydrogen removing apparatus without using a dynamic equipment.

(5) It is desirable for the catalyst bed to be molded in a honeycomb structure having meshes on which at least the catalyst is supported. The catalyst bed of the particular construction makes it possible to improve the hydrogen removing efficiency and to suppress precipitation of the aerosol-like catalyst poison material.

(6) It is possible to house in the reactor at least one heat-generating body for heating the catalyst selected from the group consisting of calcium oxide, sodium oxide, strontium oxide and a hydrogen-absorbing alloy.

In this case, when the steam concentration in the atmosphere is increased, the heat-generating body housed in the reactor such as calcium oxide reacts with steam so as to generate heat and, thus, to heat the catalyst loaded into catalyst bed within the reactor. It follows that the ammonia synthesizing reaction is promoted. Also, in the case of using a hydrogen-absorbing alloy as a heat-generating body, heat is generated by the hydrogen-absorbing reaction of the hydrogen-absorbing alloy when the hydrogen gas concentration within the atmosphere is increased. As a result, the catalyst within the reactor is heated so as to promote the ammonia synthesizing reaction.

(7) The hydrogen removing apparatus of the present invention is installed preferably within a nuclear reactor-housing vessel. The installing site within the nuclear reactor-housing vessel is not particularly limited, though it is desirable to install the hydrogen removing apparatus in the wet well free space. In this case, hydrogen and nitrogen or oxygen flowing from the dry well free space into the wet well free space through the vent pipe can be efficiently processed by the steam generated in a large amount after rupture of, for example, the nuclear reactor primary pipe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred Examples of the present invention will now be described with reference to the accompanying drawings.

EXAMPLE 1

Figure 1:
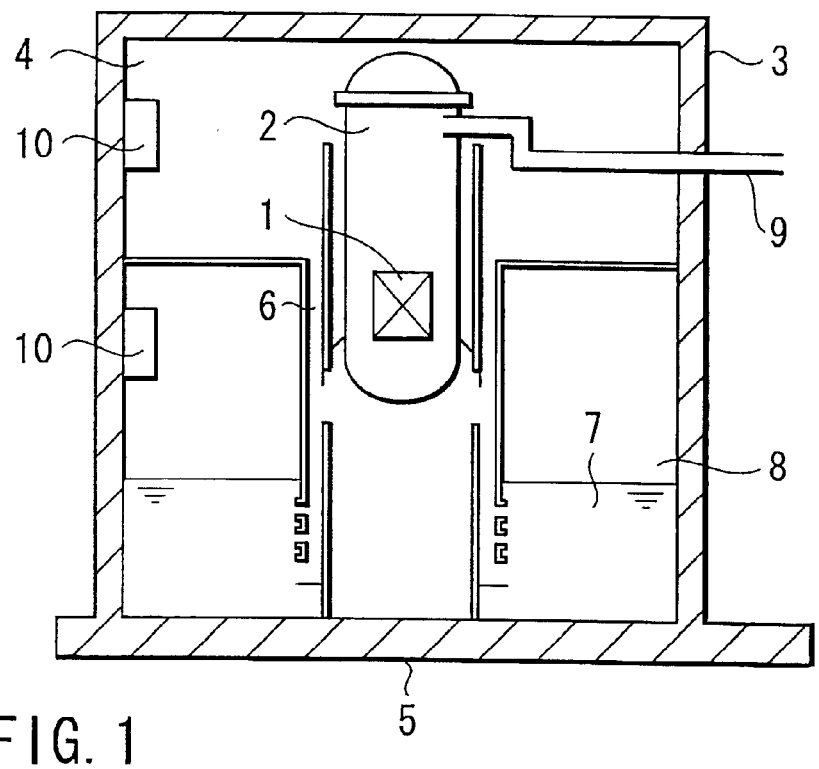
FIG. 1 is a cross sectional view schematically showing a nuclear reactor-housing vessel in which is housed a hydrogen removing apparatus according to Example 1 of the present invention.
Figure 2:
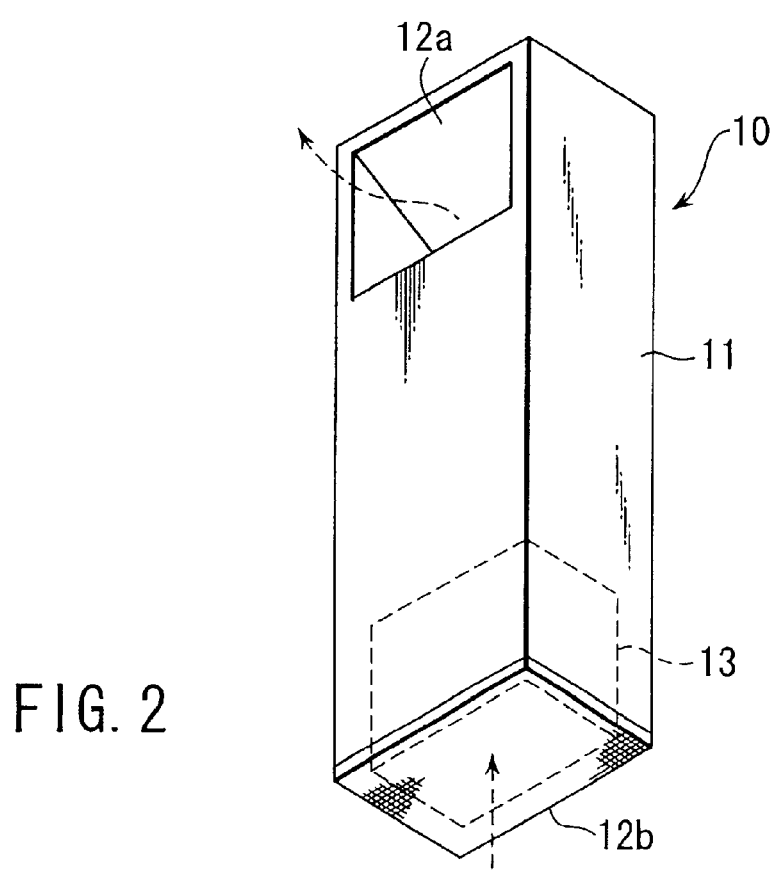
FIG. 2 is an oblique view showing the hydrogen removing apparatus housed in the nuclear reactor-housing vessel shown in FIG. 1.

FIG. 1 is a cross sectional view schematically showing a nuclear reactor-housing vessel in which is housed a hydrogen removing apparatus of Example 1, and FIG. 2 is an oblique view showing the hydrogen removing apparatus housed in the nuclear reactor-housing vessel shown in FIG. 1.

As shown in the drawings, a nuclear reactor pressure vessel 2 housing a nuclear reactor core 1 is housed in a nuclear reactor-housing vessel 3. The nuclear reactor-housing vessel 3 is filled with a nitrogen gas by exchanging an air for the nitrogen gas. The nuclear reactor-housing vessel 3 comprises an upper dry well 4 surrounding the nuclear reactor pressure vessel 2, a lower dry well 5, and a wet well 8 communicating with the upper dry well 4 via a vent pipe 6 and having a suppression pool 7 arranged therein. A nuclear reactor primary cooling pipe such as a main steam pipe 9 is connected to the nuclear reactor pressure vessel 2. Two hydrogen removing apparatus 10 are mounted in portions of the inner wall of the nuclear reactor-housing vessel 3 in which the upper dry well 4 and the wet well 8 are positioned, respectively.

Each of the hydrogen removing apparatus is provided with a reactor 11 mounted to the inner wall of the nuclear reactor-housing vessel 3, as shown in FIG. 2. The reactor 11 is provided with openings 12a, 12b. The opening 12a is formed in an upper portion of the side wall on the opposite side of the back surface abutting against the inner wall of the nuclear reactor-housing vessel. On the other hand, the opening 12b is formed in a bottom portion of the reactor 11. A catalyst bed 13 housing a catalyst for synthesizing ammonia from nitrogen and hydrogen is housed in the reactor 11. The catalyst bed 13 consists of the catalyst and a carrier of the catalyst. The catalyst bed 13 is formed by, for example, coating the inner wall of the reactor 11 with the catalyst to form a catalyst layer. It is not absolutely necessary for the catalyst bed 13 to be in the form of a layer, provided that the catalyst bed 13 is fixed within the reactor 11.

The hydrogen removing apparatus arranged within the nuclear reactor-housing vessel is operated as follows.

Where a large amount of a hydrogen gas is generated by the metal-water reaction within the nuclear reactor-housing vessel, the hydrogen and nitrogen contained in the atmosphere within the nuclear reactor-housing vessel are introduced into the reactor 11 through the opening 12b at the bottom of the reactor 11. These hydrogen and nitrogen perform a reaction in the presence of the catalyst in the catalyst bed 13 within the reactor 11 to form ammonia, as shown below:

$$3H_2 + N_2 \rightarrow 2NH_3$$

As apparent from the reaction formula given above, 3 mols of hydrogen molecules react with 1 mol of nitrogen molecule to form 2 mols of ammonia. In other words, the number of mols of the gaseous reactants is twice the number of mols of the gaseous ammonia product. What should be noted is that the volume of the product ammonia gas is half the volume of the gaseous reactants. It follows that the pressure elevation caused by the hydrogen gas that is generated in a large amount within the nuclear reactor-housing vessel 3 by the metal-water reaction is moderated, or the pressure within the nuclear reactor-housing vessel 3 is lowered, by the ammonia synthesizing reaction.

It should also be noted that the ammonia synthesizing reaction is an exothermic reaction. Therefore, the gas within the reactor 11 is heated so as to be moved upward within the reactor 11 and discharged through the opening 12a formed in an upper portion of the side wall. As a result, the atmosphere gas within the nuclear reactor-housing vessel 3 is introduced into the reactor 11 through the opening 12b at the bottom portion of the reactor 11. It follows that it is possible to introduce the atmosphere gas within the nuclear reactor-housing vessel 3 into the catalyst bed 13 within the reactor 11 by the natural circulating stream of the gas. In other words, the heat of the catalytic reaction performs the function of the driving source of the natural circulating stream of the gas. As a result, it is unnecessary to use a dynamic equipment such as a fan, making it possible to realize a small hydrogen removing apparatus that is advantageous in the manufacturing cost and the maintenance.

As a matter of fact, the pressure reducing effect within the nuclear reactor-housing vessel and the effect produced by the type of the catalyst have been experimentally confirmed as described below.

Figure 3:
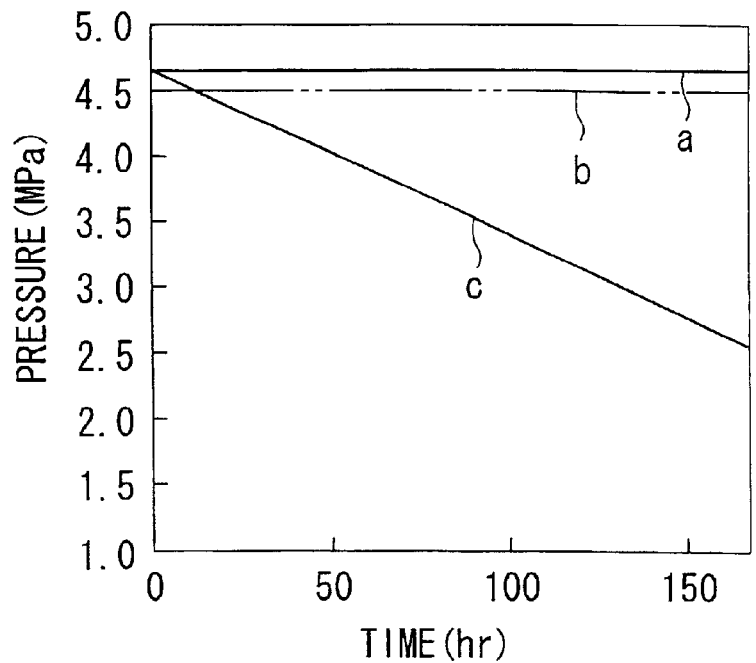
FIG. 3 is a graph showing the change with time in the pressure within the nuclear reactor-housing vessel, which supports the hydrogen removing effect produced in Example 1 of the present invention.

(1) Comparison was made between a hydrogen removing apparatus using only an oxidizing catalyst and a hydrogen removing catalyst of Example 1 in respect of the pressure reducing effect in a nuclear reactor-housing vessel in which a nitrogen gas was substituted for the inner atmosphere and rupture of a primary pipe took place, with the results as shown in a graph of FIG. 3. Line a in FIG. 3 represents the case where no measure was taken against the rupture of the primary pipe, line b in FIG. 3 represents the case where used was a hydrogen removing apparatus loaded with only an oxidizing catalyst of hydrogen, and line c represents the case where used was a hydrogen removing apparatus of Example 1 in which was loaded an ammonia synthesizing catalyst. Plotted on the abscissa of the graph of FIG. 3 is the time after start-up of the catalytic operation.

As apparent from FIG. 3, in the hydrogen removing apparatus using an oxidizing catalyst of hydrogen (line b), the amount of oxygen required for the reaction with hydrogen within the nuclear reactor-housing vessel was insufficient. As a result, a large amount of hydrogen was not removed by recombination with oxygen so as to remain within the nuclear reactor-housing vessel. Therefore, the pressure within the nuclear reactor-housing vessel was not appreciably lowered.

On the other hand, in the case of the hydrogen removing apparatus of Example 1 using an ammonia synthesizing catalyst (line c), hydrogen is allowed to perform reaction with the nitrogen gas present in a large amount within the nuclear reactor-housing vessel, making it possible to remove the hydrogen gas in a large amount. As a result, the pressure within the nuclear reactor-housing vessel was continuously lowered with time after start-up of the catalytic function. Clearly, Example 1 was found to be prominently high in the pressure reducing effect.

(2) It is desirable to use at least one material selected from the group consisting of $SiO_2$, $Al_2O_3$, $TiO_2$, $ZrO_2$ and C as a carrier for supporting the catalyst constituting the catalyst bed 13. Carbon (C) used as a carrier includes, for example, an activated charcoal.

Figure 4:
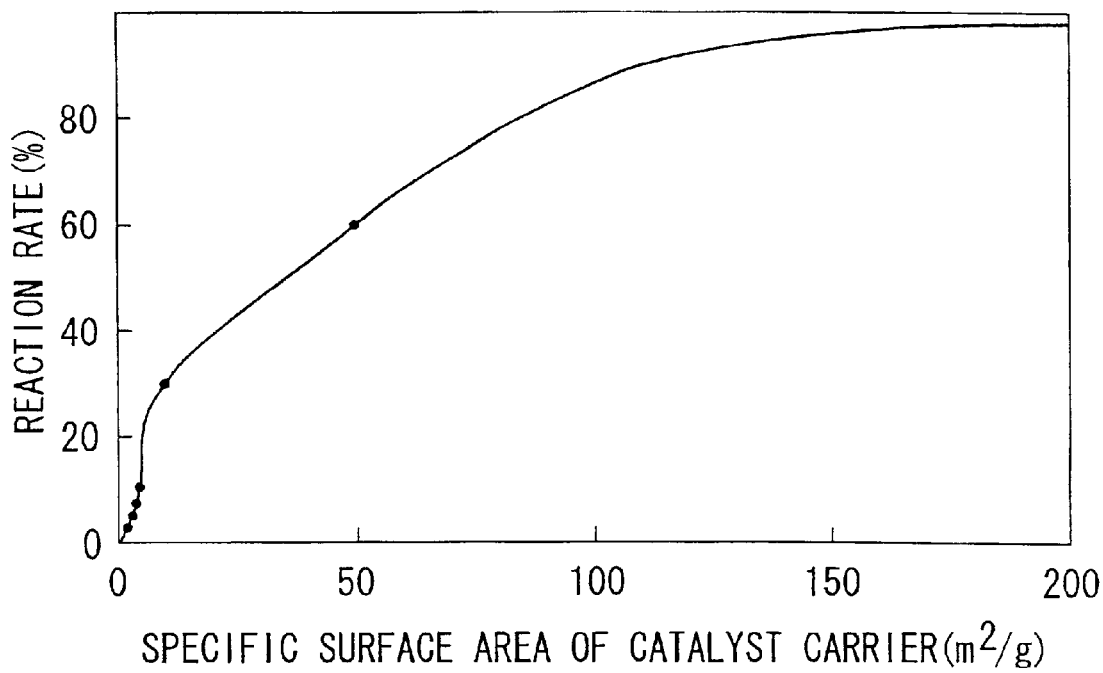
FIG. 4 is a graph showing the relationship between the specific surface area of the catalyst carrier in the catalyst bed and the reaction rate of the ammonia synthesizing reaction in Example 1 of the present invention.

The reaction rate of the ammonia synthesizing reaction described previously (reaction conversion rate) depends greatly on the specific surface area of the catalyst carrier. FIG. 4 is a graph showing the relationship between the specific surface area of the catalyst carrier and the ammonia synthesizing reaction rate. In this case, Ru was used as a catalyst metal and $SiO_2$ was used as a catalyst carrier.

As apparent from FIG. 4, the reaction rate can be made higher than 30% by using a catalyst carrier having specific surface area of at least 10 $m^2$/g so as to make it possible to remove efficiently the hydrogen gas in the presence of the catalyst. Although it is desirable for the specific surface area to be as large as possible, it is practical for the specific surface area of the catalyst carrier to fall within a range between 10 $m^2$/g and 200 $m^2$/g, as apparent from the graph of FIG. 4.

(3) It is desirable to use a noble metal or the like as an active metal, i.e., a catalyst supported on the catalyst carrier. To be more specific, it is desirable to use at least one element selected from the group consisting of Ru, Pd, Pt, Ir, W, Ag, Au, Rh and Re as the active metal supported on the carrier. These metals can be used singly or in the form of a mixture of a plurality of these metals.

Figure 5:
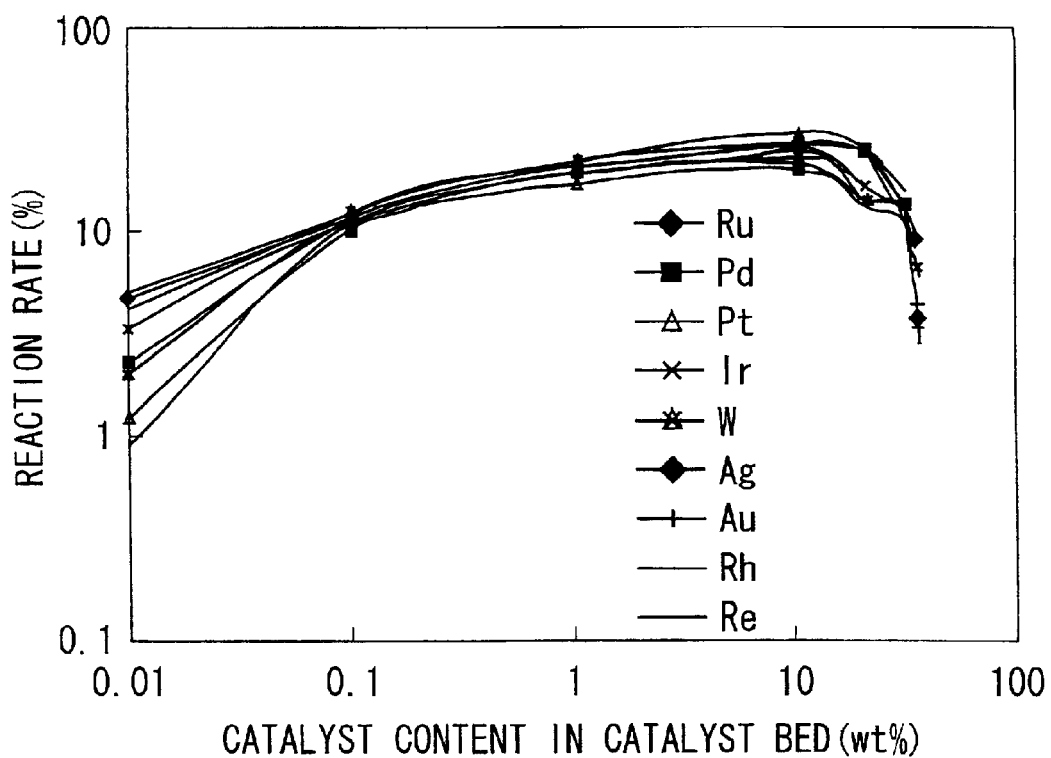
FIG. 5 is a graph showing the relationship between the catalyst content of the catalyst bed and the reaction rate of the ammonia synthesizing reaction in Example 1 of the present invention.

The reaction rate of the ammonia synthesizing reaction (reaction conversion rate) is changed depending on the content of the catalyst in the catalyst bed. FIG. 5 is a graph showing the relationship between the catalyst content (% by weight) of the catalyst bed and the reaction rate of the ammonia synthesizing reaction, covering the cases where 9 kinds of catalytic metals were used as the catalyst. In this experiment, $SiO_2$ was used as a catalyst carrier.

As apparent from FIG. 5, the reaction rate of the ammonia synthesizing reaction exceeds 10% in the case where the catalyst content of the catalyst bed 13 falls within a range of between 0.1% by weight and 50% by weight. What should be noted is that the ammonia synthesizing reaction is promoted by both the catalyst and the carrier. However, it is not absolutely desirable for the content of the catalyst to be as high as possible. In other words, the experimental data clearly support that it is necessary to set appropriately the content of the catalyst.

The chemical composition of the catalyst is determined in view of the exemplarily assumed conditions of the atmosphere within the nuclear reactor-housing vessel expected after occurrence of rupture of the nuclear reactor primary pipe so as to make it possible to realize a catalyst that permits a high ammonia synthesizing reaction rate.

In Example 1, it is possible to arrange an oxidizing catalyst of hydrogen together with the ammonia synthesizing catalyst within the reactor. In this case, the temperature of the ammonia synthesizing catalyst can be elevated by utilizing the reaction heat of the oxidizing reaction of hydrogen so as to improve the catalytic activity of the ammonia synthesizing catalyst. In addition, since the oxidizing catalyst of hydrogen consumes oxygen, it is possible to prevent the atmosphere within the nuclear reactor-housing vessel from reaching a combustible limit.

The oxidizing catalyst of hydrogen can be used in the form of a mixture consisting of the oxidizing catalyst of hydrogen and the ammonia synthesizing catalyst. It is also possible to arrange the oxidizing catalyst of hydrogen on the upstream side of the ammonia synthesizing catalyst.

Platinum (Pt) or Ru itself, which is contained in the ammonia synthesizing catalyst, also performs the function of an oxidizing catalyst of hydrogen. Therefore, it is desirable to use Pt or Ru as a catalytic metal of the ammonia synthesizing catalyst.

(4) It is desirable for the catalyst bed 13 to contain at least one co-catalyst selected from the group consisting of $CeO_2$, $La_2O_3$, MgO, $K_2O$, $Na_2O$, CaO, CsOH and $CSNO_3$.

Figure 6:
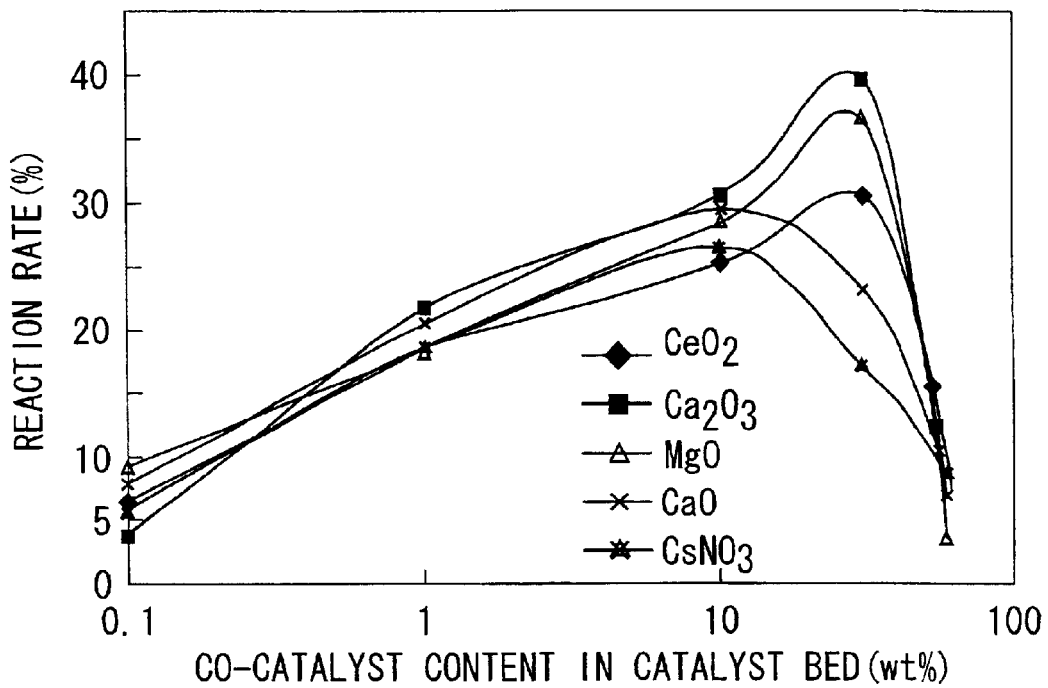
FIG. 6 is a graph showing the relationship between the co-catalyst content of the catalyst bed and the reaction rate of the ammonia synthesizing reaction in Example 1 of the present invention.

The reaction rate of the ammonia synthesizing reaction (reaction conversion rate) is also changed depending on the content of the co-catalyst in the catalyst bed. FIG. 6 is a graph showing the relationship between the co-catalyst content (% by weight) of the catalyst bed and the reaction rate of the ammonia synthesizing reaction, covering the cases where $CeO_2$, $La_2O_3$, MgO, CaO and $CsNO_3$ were used as co-catalysts. In this experiment, $SiO_2$ was used as the catalyst carrier of the catalyst bed, and Ru was used as the catalyst supported on the carrier.

As apparent from FIG. 6, if the co-catalyst content of the catalyst bed 13 is set to fall within a range of between 1% by weight and 30% by weight, the reaction rate exceeds about 20%, supporting that the ammonia synthesizing reaction is carried out efficiently. In other words, it is not absolutely necessary to set the co-catalyst content as high as possible. The experimental data clearly support that it is desirable to set the co-catalyst content to fall within a range of between 1% by weight and 30% by weight in order to carry out the ammonia synthesizing reaction efficiently. In this case, it is also possible to markedly increase the catalytic effect, i.e., the effect of increasing the ammonia synthesizing reaction rate.

As described above, the hydrogen gas generated within the nuclear reactor-housing vessel is allowed to react with the nitrogen gas in Example 1 to synthesize ammonia so as to decrease the gas volume within the nuclear reactor-housing vessel to half the total volume of the hydrogen gas and the nitrogen gas. It follows that the pressure elevation caused by the hydrogen gas generation can be suppressed, or the pressure within the nuclear reactor-housing vessel can be lowered. It is also possible to make it unnecessary to install a dynamic equipment such as a fan so as to realize a small hydrogen removing apparatus that is advantageous in the manufacturing cost and the maintenance.

As described above, where the hydrogen removing apparatus of the present invention is installed within the nuclear reactor-housing vessel, the volume of the gas within the vessel can be decreased to half the total volume of the hydrogen gas and the nitrogen gas within the vessel by the ammonia synthesizing reaction carried out in the presence of the catalyst bed within the reactor between the hydrogen gas and the nitrogen gas. In addition, the synthesized ammonia is highly soluble in water and, thus, can be dissolved in water within the suppression pool arranged within the nuclear reactor-housing vessel so as to effectively remove ammonia. As a result, the pressure elevation caused by the hydrogen gas generation within the nuclear reactor-housing vessel can be suppressed more effectively.

To be more specific, if the gaseous materials are naturally circulated within the reactor 11, the synthesized ammonia is discharged into the nuclear reactor-housing vessel 3 through the opening 12a formed in an upper portion of the side wall of the reactor 11. Also, the nitrogen, oxygen and hydrogen gases containing ammonia discharged from the hydrogen removing apparatus 10 arranged within the upper dry well 4 are moved through the vent pipe 6 into the wet well 8 so as to be combined with the nitrogen, oxygen and hydrogen gases containing ammonia discharged from the hydrogen removing apparatus 10 arranged within the wet well 8. It should be noted that nitrogen, oxygen and hydrogen gases are scarcely dissolved in water. On the other hand, ammonia is highly soluble in water and, thus, is dissolved in the water within the suppression pool 7 arranged within the wet well 8 so as to remove ammonia from the atmosphere within the nuclear reactor-housing vessel.

In Example 1, the hydrogen removing apparatus 10 is arranged within each of the upper dry well 4 and the wet well 8. However, it is possible to arrange the hydrogen removing apparatus 10 within one of these wells 4 and 8. In the case of using only one hydrogen removing apparatus, it is desirable to arrange the hydrogen removing apparatus 10 within the wet well 8. It should be noted in this connection that, if the nuclear reactor primary pipe is ruptured, the nitrogen, oxygen and hydrogen gases within the dry wells 4 and 5 are caused to be moved into the wet well 8 through the vent pipe 6 by the steam discharged in a large amount into the upper and lower dry wells 4 and 5. Naturally, the partial pressures of the hydrogen and nitrogen gases are increased within the wet well 8. As a result, the hydrogen removing rate achieved by the catalytic ammonia synthesizing reaction can be increased if the hydrogen removing apparatus 10 is arranged within the wet well 8, compared with the case where the hydrogen removing apparatus 10 is arranged within the upper dry well 4 or 5. In other words, the hydrogen gas can be removed efficiently by arranging the hydrogen removing apparatus 10 in the free space within the wet well B.

EXAMPLE 2

Example 2 is directed to a suitable shape of the catalyst bed used in the hydrogen removing apparatus of Example 1 described above.

Figures 7A, 7B:
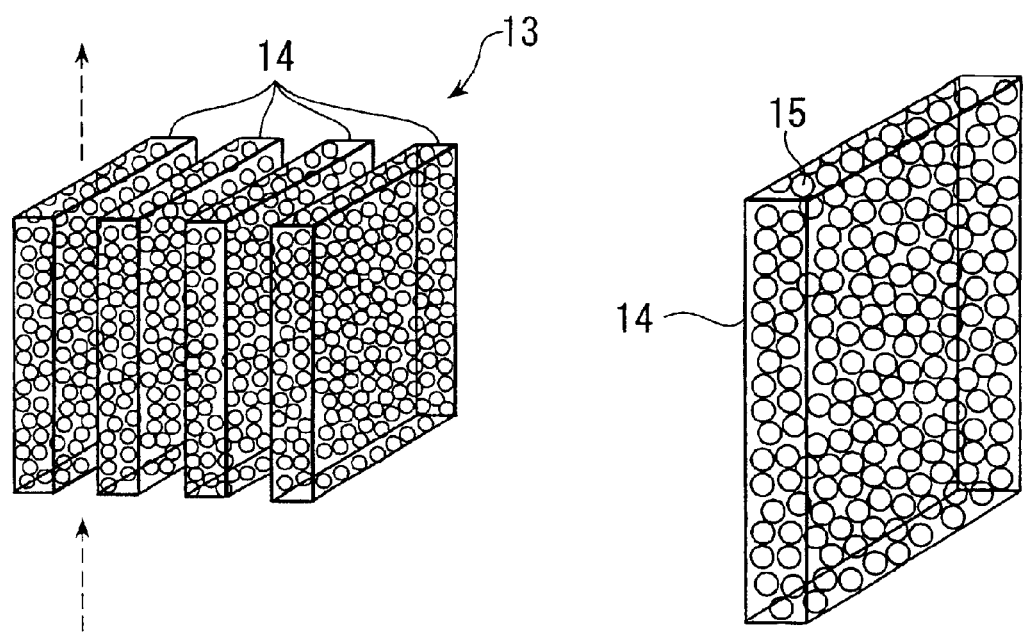
FIG. 7A is an oblique view showing a cartridge type catalyst bed according to Example 2 of the present invention, the catalyst bed being used in a hydrogen removing apparatus arranged in a nuclear reactor-housing vessel.
FIG. 7B is an oblique view showing the cartridge constituting the catalyst bed shown in FIG. 7A.

Specifically, FIG. 7A is an oblique view showing a cartridge type catalyst bed 13 used in the hydrogen removing apparatus of Example 2, which is arranged within a nuclear reactor-housing vessel, and FIG. 7B is an oblique view showing the cartridge 14 constituting the catalyst bed shown in FIG. 7A.

Catalysts 15 molded in a granular shape are loaded in the plate-like cartridge 15. The catalyst bed 13, which is arranged within the reactor 11 shown in FIG. 2, is formed by arranging a plurality cartridges 14 a desired distance apart from each other. It should be noted that the clearance between adjacent cartridges 14 provides a gas passageway substantially perpendicular to the bottom surface of the reactor 11.

The surface layer of the cartridge 14 is formed of a porous material or a mesh-like material such that the gaseous materials within the reactor are circulated into the inner space of the cartridge 14 through the porous or mesh-like surface layer.

According to Example 2, the catalyst bed 13 is formed of a plurality of cartridges 14 and a gas flow passageway extending substantially perpendicular to the bottom surface of the reactor is formed in the clearance between adjacent cartridges 14. Therefore, the gaseous materials within the nuclear reactor-housing vessel are introduced into the reactor arranged in the hydrogen removing apparatus as shown in FIG. 1 so as to be brought into contact with the granular catalyst particles arranged within the cartridges 14. When the gaseous materials are brought into contact with the granular catalyst particles, the ammonia synthesizing reaction, which is exothermic, is carried out between nitrogen gas and the hydrogen gas so as to promote formation of a natural circulating gas stream within the reactor. As a result, a natural circulating gas stream is formed between the two openings of the reactor and the inner space of the nuclear reactor-housing vessel without using a dynamic equipment.

It should also be noted that an aerosol type catalyst poison material is contained in the gaseous materials within the nuclear reactor-housing vessel together with the hydrogen, nitrogen and oxygen gases. If the catalyst poison material is attached to the catalyst, the catalytic activity of the catalyst is impaired. In the catalyst bed of the construction shown in FIG. 7A, however, a gas passageway is formed in the clearance between adjacent cartridges 14 within the reactor (not shown). As a result, the aerosol within the gaseous materials moved upward through the gas passageway is moved upward as it is and scarcely enters the cartridge 14 because the catalyst poison material in the form of an aerosol has a specific gravity larger than that of any of the other gaseous materials such as the hydrogen gas. On the other hand, any of the other gaseous materials such as the hydrogen gas has a small specific gravity and, thus, is rapidly diffused into the cartridge 14 in place of being moved upward through the gas passageway formed between adjacent cartridges 14. It follows that it is possible to prevent the catalyst poison material in the form of an aerosol from being attached to the surface of the catalyst particle loaded in the cartridge 14 by utilizing the difference in the diffusion rate into the cartridge 14 between the reactant gaseous materials and the catalyst poison material, the difference in the diffusion rate being derived from the difference in the specific gravity between the two.

Further, since the catalyst bed 13 in Example 2 consists of a plurality of catalyst cartridges 14, the periodic inspection of the catalytic performance and renewal of the cartridge 14 can be carried out without difficulty.

EXAMPLE 3

Example 3 is directed to another preferred shape of the catalyst bed used in the hydrogen removing apparatus of Example 1.

Figure 8:
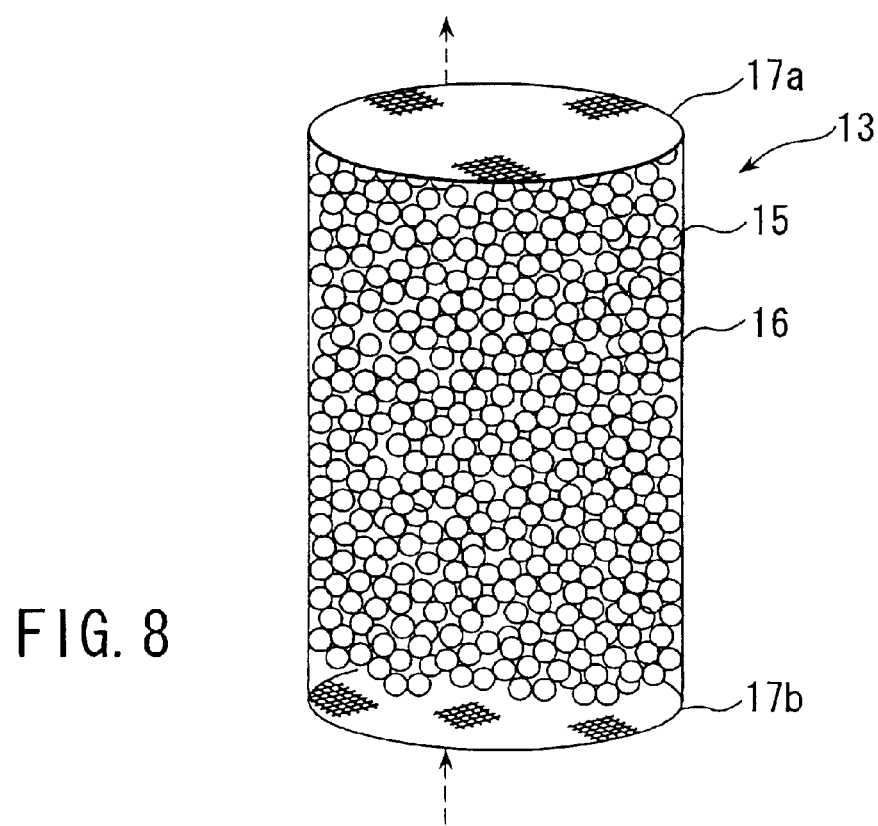
FIG. 8 is an oblique view showing a catalyst bed according to Example 3 of the present invention, the catalyst bed being used in a hydrogen removing apparatus arranged in a nuclear reactor-housing vessel.

Specifically, FIG. 8 is an oblique view showing a catalyst bed 13 of Example 3, which is used in a hydrogen removing apparatus arranged in a nuclear reactor-housing vessel.

As shown in the drawing, the catalyst bed 13 is formed by loading catalyst particles 15 molded in a granular shape in a cylindrical cartridge 16. Gas circulating sections 17a, 17b, which are in the form of, for example, a mesh, are formed in the top portion and the bottom portion, respectively, of the cylindrical cartridge 16. It is possible to use a porous material for forming the gas circulating sections 17a, 17b. The catalyst bed 13 of the particular construction is housed in the reactor 11 shown in FIG. 2, and the gaseous materials within the reactor are circulated into the cartridge 16 through the gas circulating sections 17a, 17b.

According to Example 3, the catalyst bed 13 is formed of the cylindrical cartridge 16 having the gas circulating sections 17a, 17b formed in the top and bottom portions thereof, respectively. Therefore, the gaseous materials within the nuclear reactor-housing vessel shown in FIG. 1 are introduced through the openings of the reactor arranged in the hydrogen removing apparatus into the reactor so as to be brought into contact with the granular catalyst particles. As a result, an ammonia synthesizing reaction, which is exothermic, is brought about so as to promote formation of a natural circulating gas stream within the reactor. It follows that a natural gas circulating stream is formed between the two openings of the reactor and the inner space of the nuclear reactor-housing vessel without using a dynamic equipment, as in Example 2.

It should also be noted that, since the catalyst 15 loaded in the catalyst bed 13 is molded in a granular shape, the catalyst particles 15 can be loaded in the cylindrical cartridge 16 in a high density, making it possible to further improve the hydrogen removing efficiency achieved by the catalytic ammonia synthesizing reaction.

EXAMPLE 4

Example 4 is directed to another suitable shape of the catalyst bed used in the hydrogen removing apparatus of Example 1.

Figure 9:
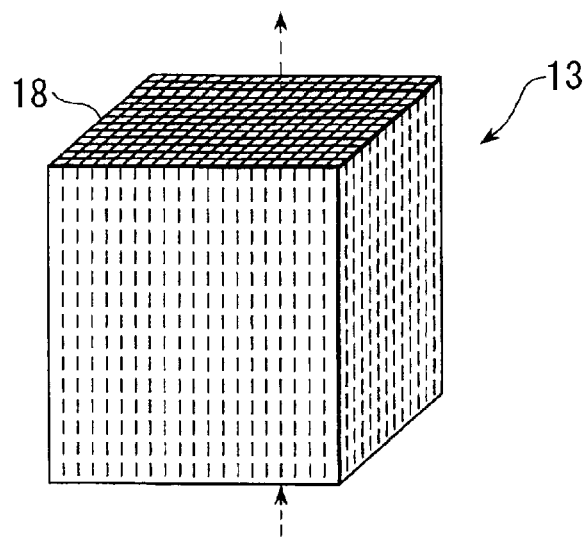
FIG. 9 is an oblique view showing a catalyst bed according to Example 4 of the present invention, the catalyst bed being used in a hydrogen removing apparatus arranged in a nuclear reactor-housing vessel.

Specifically, FIG. 9 is an oblique view showing a catalyst bed 13 of Example 4, which is used in a hydrogen removing apparatus arranged in a nuclear reactor-housing vessel.

The catalyst bed 13 in Example 4 consists of a catalyst carrier molded to have a honeycomb structure and a catalytic metal as well as a co-catalyst component, as desired, which are supported on a large number of meshes 18 of the catalyst carrier having a honeycomb structure. It is desirable for the honeycomb structure to have meshes falling within a range of between 100 and 1200 cells/inch$^2$. The catalyst bed 13 is housed in the reactor 11 shown in FIG. 2. In the catalyst bed 13, the gaseous materials within the reactor flow through the meshes 18 inside the honeycomb structure.

According to Example 4, the catalyst bed 13 has a honeycomb structure and the gaseous materials flow through the meshes 18 of the honeycomb structure. Therefore, the gaseous materials within the nuclear reactor-housing vessel are introduced through the openings of the reactor of the hydrogen removing apparatus so as to be brought into contact with the catalyst supported by the meshes 18 of the honeycomb structure. As a result, an ammonia synthesizing reaction, which is exothermic, is brought about so as to promote formation of a natural circulating gas stream within the reactor. It follows that a natural gas circulating stream is formed between the two openings of the reactor and the inner space of the nuclear reactor-housing vessel without using a dynamic equipment, as in Example 2.

Also, the meshes of the honeycomb structure are set to fall within a range of between 100 and 1200 cells/inch$^2$, i.e., between 19.7 and 236.2 cells/cm$^2$. By forming 19.7 to 236.2 meshes per cm$^2$, the hydrogen removing rate achieved in the presence of the catalyst is increased and the natural gas circulating rate can be increased.

EXAMPLE 5

Example 5 is directed to the catalyst bed used in the hydrogen removing apparatus of Example 1 and to a suitable shape of the cartridge forming the catalyst bed.

Figures 10A, 10B, 10C:
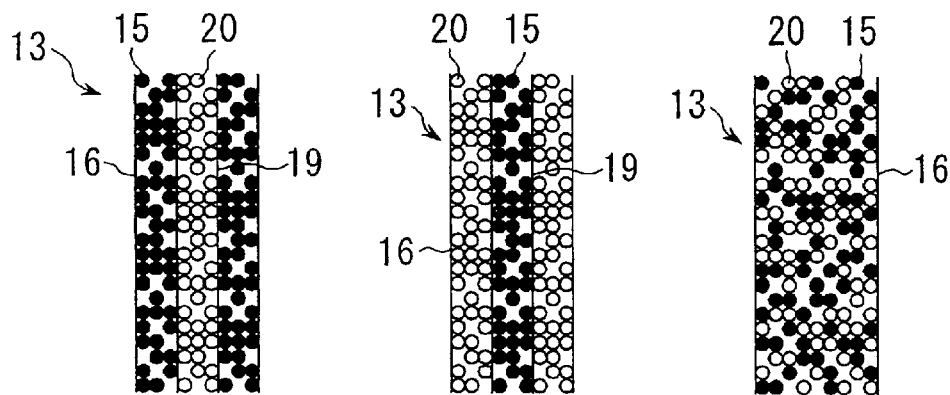
FIGS. 10A to 10C are cross sectional views each showing partly the catalyst bed according to Example 5 of the present invention, the catalyst bed being used in a hydrogen removing apparatus arranged in a nuclear reactor-housing vessel.
Figure 11:
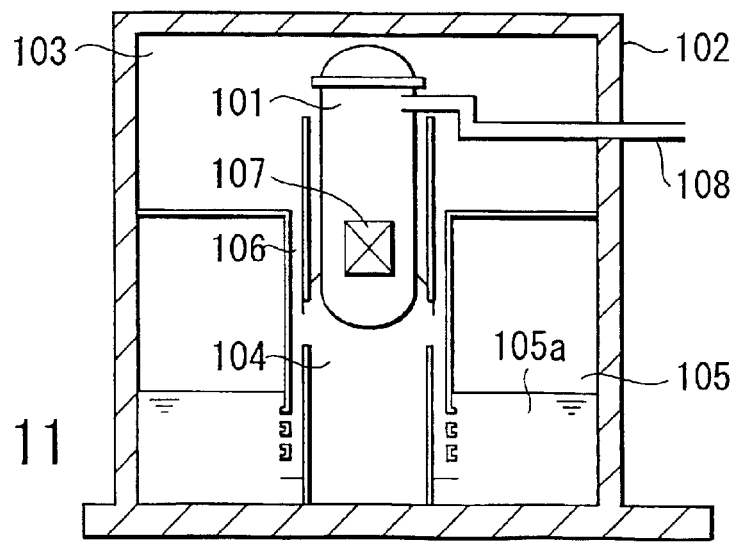
FIG. 11 is a cross sectional view schematically showing a conventional nuclear reactor-housing vessel.

Specifically, FIGS. 10A, 10B, and 10C are cross sectional views each schematically showing a part of the catalyst bed of Example 5.

The catalyst bed 13 shown in FIG. 10A comprises a cylindrical cartridge 16 having gas circulating sections (not shown), which are in the form of, for example, meshes, formed in the top and bottom portions, respectively, and a cylindrical body 19 having a small diameter and arranged concentric relative to the cartridge 16. Granular catalyst particles 15 are loaded in the clearance between the cylindrical cartridge 16 and the cylindrical body 19 having a small diameter. Further, granular heat generating particles 20 are loaded within the cylindrical body 19 having a small diameter.

The catalyst bed 13 shown in FIG. 10B comprises a cylindrical cartridge 16 having gas circulating sections (not shown), which are in the form of, for example, meshes, formed in the top and bottom portions, respectively, and a cylindrical body 19 having a small diameter and arranged concentric relative to the cartridge 16. The granular heat generating particles 20 are loaded in the clearance between the cylindrical cartridge 16 and the cylindrical body 19 having a small diameter. Further, the granular catalyst particles 15 are loaded within the cylindrical body 19 having a small diameter.

Further, the catalyst bed 13 shown in FIG. 10C comprises a cylindrical cartridge 16 having gas circulating sections (not shown), which are in the form of, for example, meshes, formed in the top and bottom portions, respectively. In this case, the granular catalyst particles 15 and the granular heat generating particles 20 are loaded in mutual contact within the cylindrical cartridge 16.

It is desirable to use particles of calcium oxide, sodium oxide, strontium oxide or hydrogen absorbing alloy as the heat generating particles.

According to Example 5, e.g., the catalyst bed 13 shown in FIG. 10A, a reaction takes place between the granular heat generating particles 20, e.g., calcium oxide particles, loaded within the cylindrical body having a small diameter, which is arranged within the cylindrical cartridge 16, and steam to form calcium hydroxide, when steam is generated within the nuclear reactor-housing vessel by the breakage of the nuclear reactor primary pipe and enters the catalyst bed through the openings of the reactor of the hydrogen removing apparatus, as shown below:

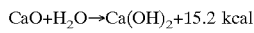

$$CaO + H_2O \rightarrow Ca(OH)_2 + 15.2 \text{ kcal}$$

By the heat generation from the granular heat generating particles 20 loaded within the cylindrical body 19 having a small diameter, the granular catalyst particles 15 loaded in the clearance between the cylindrical cartridge 16 and the cylindrical body 19 having a small diameter are heated and, thus, the granular catalyst particles 15 are activated. Also, even if water droplets causing the catalytic activities to be lowered are present on the surface of the granular catalyst particles 15, the water droplets are removed from the surface of the granular catalyst particles 15 by the heat generated from the granular heat generating particles 20 before the granular catalyst particles 15 are heated to the operating temperature. It follows that satisfactory catalytic activities are maintained.

The catalyst bed shown in each of FIGS. 10B and 10C also produces the function and effect described above.

The function and effect substantially equal to that described above can be obtained in the case where particles of sodium oxide or strontium oxide are used in place of the calcium oxide particles as the granular heat generating particles 20. On the other hand, in the case of using particles of a hydrogen absorbing alloy as the granular heat generating particles 20, the hydrogen absorbing alloy particles absorb hydrogen when the hydrogen concentration within the nuclear reactor-housing vessel shown in FIG. 1 is increased so as to generate heat. As a result, the granular catalyst particles 15 are heated so as to exhibit an improved catalytic activity.

Incidentally, if a fan is mounted in the vicinity of the openings of the reactor in the hydrogen removing apparatus of the present invention, the gaseous materials within the nuclear reactor-housing vessel are forcedly introduced into the reactor so as to promote the gas substitution in the catalyst bed. As a result, ammonia formed by the catalytic reaction is forcedly removed by the fan from the reaction site so as to further improve the ammonia synthesizing reaction rate.

As described above, the present invention provides a hydrogen removing apparatus capable of removing without fail the hydrogen gas generated within a hermetically closed space having a low oxygen concentration and filled with a nitrogen gas so as to suppress the pressure elevation caused by the hydrogen generation within the closed space and, thus, to ensure satisfactory conditions within the closed space.

The present invention also provides a hydrogen removing apparatus that can be arranged within a nuclear reactor-housing vessel and that permits effectively suppressing the pressure elevation caused by the hydrogen gas generation within the nuclear reactor-housing vessel without releasing the gaseous materials within the nuclear reactor-housing vessel to the outer atmosphere.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nuclear power plant comprising:
a nuclear reactor-housing vessel in which a nitrogen gas is substituted for the inner atmosphere;
a nuclear reactor pressure vessel housed in the nuclear reactor-housing vessel and connecting with a nuclear reactor primary cooling pipe;
a reactor core arranged in the nuclear reactor pressure vessel; and
a hydrogen removing apparatus arranged within the nuclear reactor-housing vessel,
wherein the hydrogen removing apparatus comprises a reactor having two openings for circulating the gaseous materials within the nuclear reactor-housing vessel into the reactor, and a catalyst bed arranged within the reactor and loaded with a catalyst for an ammonia synthesizing reaction between a nitrogen gas and a hydrogen gas.

2. The nuclear power plant according to claim 1, wherein a catalyst for a water synthesizing reaction between an oxygen gas and a hydrogen gas is further loaded in said catalyst bed arranged within said reactor.

3. The nuclear power plant according to claim 1, wherein at least one element selected from the group consisting of Ru, Pd, Pt, Ir, W, Ag, Au, Rh and Re is used as said catalyst and said catalyst is contained in the catalyst bed in an amount of 0.1 to 50% by weight.

4. The nuclear power plant according to claim 1, wherein said catalyst bed comprises said catalyst and a catalyst carrier consisting of at least one material selected from the group consisting of $SiO_2$, $Al_2O_3$, $TiO_2$, $ZrO_2$ and C.

5. The nuclear sower plant according to claim 4, wherein said catalyst carrier has a specific surface area falling within a range of between 10 m$^2$/g and 200 m$^2$/g.

6. The nuclear power plant according to claim 1, wherein said catalyst bed further contains at least one co-catalyst selected from the group consisting of $CeO_2$, $La_2O_3$, MgO, $K_2O$, $Na_2O$, CaO, CsOH and $CsNO_3$.

7. The nuclear power plant according to claim 6, wherein said co-catalyst is contained in the catalyst bed in an amount of 1 to 30% by weight.

8. The nuclear power plant according to claim 1, wherein said catalyst bed consists of a plurality of plate-like cartridges loaded with granular catalyst particles and arranged a predetermined distance apart from each other.

9. The nuclear power plant according to claim 1, wherein said catalyst bed consists of a cylindrical cartridge loaded with granular catalyst particles, said cartridge having gas circulating sections formed in at least the top portion and the bottom portion of the cartridge for circulation of the gaseous materials present both inside and outside the cartridge.

10. The nuclear power plant according to claim 1, wherein said catalyst bed is in the form of a molded honeycomb structure having meshes supporting at least a catalyst.

11. The nuclear power plant according to claim 1, wherein at least one heat generating body for heating the catalyst, which is selected from the group consisting of calcium oxide, sodium oxide, strontium oxide and a hydrogen absorbing metal, is housed in said reactor.

* * * * *

UNITED STATES PATENT AND TRADEMARK OFFICE
CERTIFICATE OF CORRECTION

PATENT NO. : 6,902,709 B1
DATED : June 7, 2005
INVENTOR(S) : Harada et al.

It is certified that error appears in the above-identified patent and that said Letters Patent is hereby corrected as shown below:

<u>Column 14,</u>
Line 61, change "sower" to -- power --.

Signed and Sealed this

Sixteenth Day of August, 2005

JON W. DUDAS
*Director of the United States Patent and Trademark Office*